United States Patent [19]
Robison et al.

[11] 3,917,967
[45] Nov. 4, 1975

[54] ELECTRIC MOTOR ARMATURE CONSTRUCTION

[75] Inventors: Russell O. Robison, Plymouth, Ohio; Malvin L. Fender, Elloree, S.C.

[73] Assignee: Rockwell International Corporation, Pittsburgh, Pa.

[22] Filed: Jan. 17, 1974

[21] Appl. No.: 434,330

Related U.S. Application Data

[63] Continuation of Ser. No. 212,157, Dec. 27, 1971, abandoned.

[52] U.S. Cl. .................... 310/42; 310/43; 310/215
[51] Int. Cl. ............................................ H02k 15/08
[58] Field of Search.......... 310/43, 45, 42, 214–218, 310/262, 264, 265

[56] References Cited
UNITED STATES PATENTS
2,473,332   6/1949   England ............................ 310/215

FOREIGN PATENTS OR APPLICATIONS
1,158,589   6/1958   France ............................ 310/215
1,210,349   3/1960   France ............................ 310/215

*Primary Examiner*—Donovan F. Duggan

[57] ABSTRACT

An electric motor armature having an electrical insulating sleeve molded between the armature core and armature shaft and having a pair of radial flanges disposed adjacent to the opposite end faces of the armature core. Insulating liners, positioned in the armature slots for insulating the armature coils from the armature core, are engaged by the radial flanges in such a manner that the flanges prevent objectionable axial movement of the liners during the initial stage of winding armature wire on the armature core.

13 Claims, 9 Drawing Figures

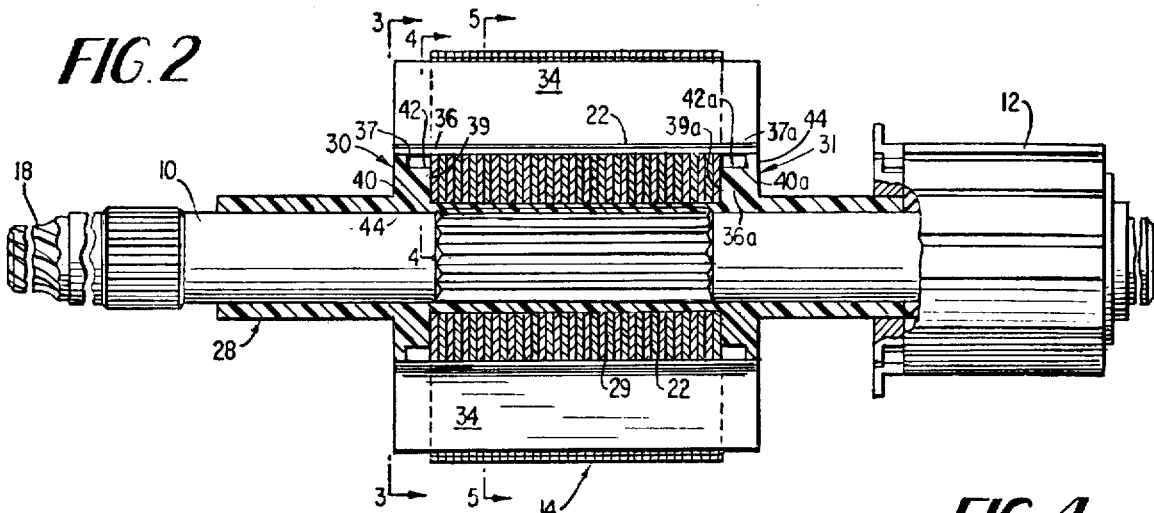
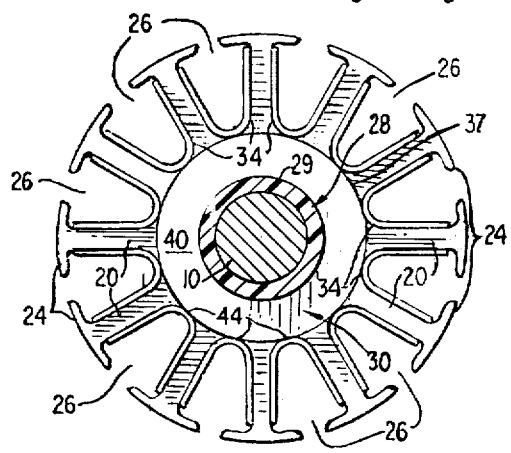
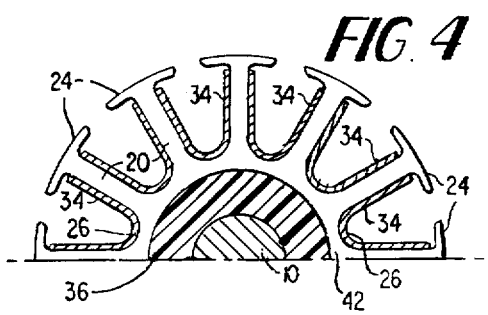
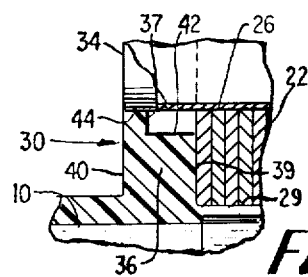
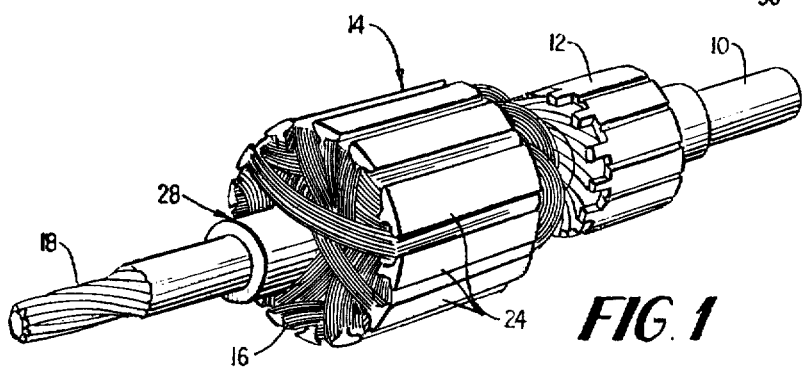

ELECTRIC MOTOR ARMATURE CONSTRUCTION

This is a continuation, of application Ser. No. 212,157, filed Dec. 27, 1971, now abandoned.

FIELD OF INVENTION

This invention relates to electric motor armature assemblies and is particularly concerned with those armature constructions that are adapted for use in electrical powered devices.

BACKGROUND & SUMMARY OF INVENTION

In the manufacture of electric motor armatures, it has been the practice to position paper insulating liners in the outwardly opening armature core slots before wrapping the conductors of the armature winding on the core. In this manner, a layer of insulation is provided between the surfaces of the armature core slots and the conductors of the winding in the final assembly of the armature.

Such insulating liners provide an economical means of insulating uninsulated armature core wire from the core. However, they slide easily in the armature core slots under the influence of forces exerted when the armature wire is pulled through the slots at the beginning of winding or wrapping the armature wire on the core. As a result, the insulating liners are frequently shifted out of position to allow objectional contact between the armature wire and the core.

The present invention overcomes the foregoing problem by forming an armature insulating sleeve with a pair of radial retaining flanges for preventing objectionable axial movement of the insulating liners during the initial stage of winding the armature wire on the core. The armature insulating sleeve has a tubular portion molded between the core and the armature shaft to electrically insulate the armature core from the armature shaft, and the retaining flanges are an integral, molded part of the insulating sleeve. At the beginning of winding the armature wire on the core, the insulating liners extend at both ends axially beyond the armature core and are axially retained in their proper positions by engagement with the retaining flanges.

In one embodiment, the protruding ends of the insulating liners seat on the outermost circumferential peripheries of the flanges in such a manner that the liners are axially retained in place by frictional engagement with the peripheries of the flanges. In another embodiment, the insulating liners are axially held in place by axial abutment with axially opposed surfaces of the retaining flanges. After a sufficient number of turns are wound on the core, it will be appreciated that the insulating liners will be held in place by the wound armature wire.

From the foregoing it will be appreciated that the molded armature insulating sleeve of this invention serves a dual purpose. First, it electrically insulates the armature from the armature shaft as mentioned above. This construction is particularly important in electrically driven power hand tools (such as hand drills, for example) and other similar devices for reducing the hazard of electrical shock. The second purpose, as described above, is to provide retaining flanges which engage the protruding ends of the insulating liners to oppose or resist axial displacement of the liners during the initial stage of winding the armature wire on the core.

By utilizing portions of the molded armature insulating sleeve to axially retain the insulating liners in place during the initial stage of winding, it will be appreciated that no subsequent and additional steps or parts are required during manufacture to prevent the insulating liners from axially sliding as the armature wire is pulled through the armature core slots to form the armature coils.

By wrapping the armature wire around the slot-defining ribs of the armature core, the protruding ends of the insulating liners are folded or bent over the end faces of the ribs to provide a layer of electrical insulation between the wound armature coils and the ends faces of the armature core. As a result, the armature coils will be completely insulated from the armature core by the insulating liners. In this manner the need for separate end discs or fibers for insulating the armature core end faces is eliminated. Such end discs are shown at 24 in the drawings of U.S. Pat. No. 3,214,621 issued on Oct. 26, 1965 to E. C. Quear et al.

With the foregoing in mind, a primary object of this invention is to provide an armature with a novel means for preventing the armature core insulating liners from axially sliding along the slots of the core during the initial stage of winding armature coil wire on the core.

A more specific object of this invention is to provide a novel armature construction wherein armature slot insulating liners are axially retained in place during the initial stage of winding the armature wire by radial flanges which form an integral part of an armature sleeve that is molded between the core and the armature shaft to electrically insulate the latter from the former.

Another object of this invention is to provide a novel armature construction which is simplified and economical to manufacture.

Still another object of this invention is to provide a novel armature slot insulating means that eliminates the need for insulating end discs or fibers.

Further objects of this invention will appear as the description proceeds in connection with the appended claims and the below-described drawings.

DESCRIPTION OF DRAWINGS

FIG. 1 is a perspective view of an armature construction incorporating the principles of this invention;

FIG. 2 is a longitudinal section of the armature construction shown in FIG. 1 prior to winding the armature coil wire on the armature core;

FIG. 2A is an enlarged, fragmentary, slightly exaggerated view of the armature construction shown in FIG. 2;

FIG. 3 is a section view substantially along lines 3—3 of FIG. 2;

FIG. 4 is a section taken substantially along lines 4—4 of FIG. 2;

DETAILED DESCRIPTION

Figure 7:
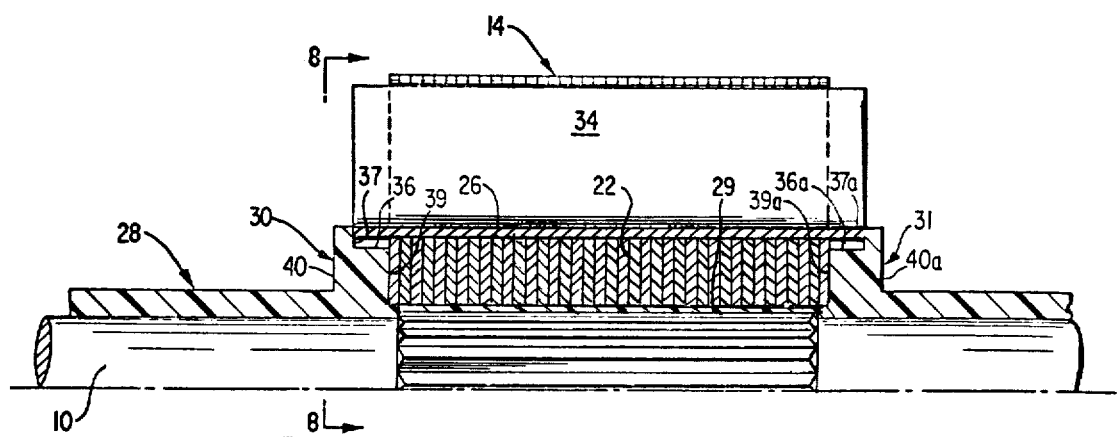
FIG. 7 is a fragmentary section similar to FIG. 2, but showing another embodiment incorporating the principles of this invention.

Referring now to the drawings and more particularly to FIG. 1, the electric motor armature assembly incorporating the principles of this invention is shown to comprise an armature shaft 10, a commutatot 12 coaxially mounted on shaft 10, an armature core 14 coaxially mounted on shaft 10 axially adjacent to commutator 12, and an armature winding 16 having a plurality of coils wound on core 14. A gear 18 may be formed on one end of shaft 10 for drive connecting the armature shaft through a gear train to an unshown output member such as a power driven hand tool (not shown).

Figure 5:
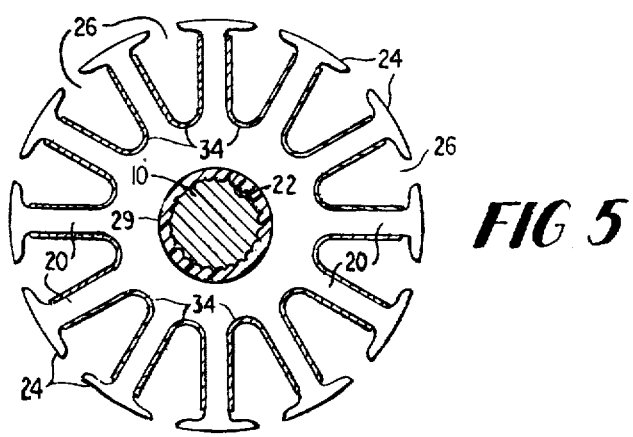
FIG. 5 is a section taken substantially along lines 5—5 of FIG. 2.

Commutator 12 is of conventional construction and has a series of radially extending commutator segments as shown. Core 14 is of conventional, stacked, laminated construction and, as shown in FIGS. 4 and 5, has a series of relatively thin, equiangularly spaced apart ribs 20 that extend radially from a hub portion 22 (see FIG. 5). Ribs 20 terminate at their outer ends in circumferential segments 24 as shown. A series of equiangularly spaced apart, radially outwardly opening slots 26 are defined between adjacently disposed ribs 20 in the usual manner. Slots 26 are open at axially opposite ends as shown in FIG. 2, and in cross section, the side wall surfaces of the slots diverge radially outwardly. The axially opposite end faces of core 14, as defined by the ends of ribs 20 and hub 22, are flat and are contained in parallel planes normally intersecting the rotational axis of the armature.

The coils of winding 16 are conventionally wound on core 14 and are formed from insulated armature wire. In forming the armature coils, the armature wire is pulled through slots 26 and looped around the end faces of ribs 20 in the usual manner. The armature coils are conventionally connected to commutator 12 as shown in FIG. 1.

As shown in FIGS. 2–5, a molded, one-piece, rigid, armature insulating sleeve member 28 is coaxially molded on shaft 10 and has a sleeve portion 29 coaxially receiving shaft 10. Sleeve portion 29 comprises an intermediate tubular section disposed radially between core 14 and shaft 10 to electrically insulate shaft 10 from core 14. Sleeve member 28 is formed from any suitable, electrical insulating material such as a glass filled phenolic resin. Advantageously, sleeve member 28 is molded between armature core 14 and shaft 10 by holding core 14 and shaft 10 in fixed, radially spaced apart, concentric relationship in suitable fixtures and by injecting the molding material into the space between core 14 and shaft 10.

As shown in FIG. 2, sleeve portion 29 extends at both ends axially beyond core 14. The segments of sleeve portion 29 disposed axially beyond core 14 have equal, uniform wall thickness that are significantly greater than the uniform thickness of the intermediate part of portion 29 which is disposed radially between core 14 and shaft 10. Shaft 10 and sleeve portion 29 coaxially extend through a bore that is concentrically formed in the hub portion of core 14.

Still referring to FIG. 2, a pair of annular flanges 30 and 31 form an integral, molded part of sleeve member 28 for axially retaining insulating liners 34 in armature slots 26. Liners 34 are of conventional construction and may be formed from paper or other suitable, pliable and foldable, usually flat-sided electrical insulating material. Liners 34 are positioned one in each of the armature core slots 26 to protect the armature wire insulation from damage and provide additional insulation that protects against shorting in case the armature wire insulating breaks down or is damaged in regions adjacent to core 14.

Liners 34, upon being inserted into slots 26, are longitudinally and medially folded in such a manner that each liner seats on and covers the side and bottom walls of its armature core slots. Thus, in cross section, liners 34 conform to the configuration of slots 26. In this embodiment, the ends of liners 34 are cuffless as shown in FIG. 2.

With the foregoing slot insulating liner construction, it will be appreciated that unless otherwise axially restrained, liners 34 are axially slidable in slots 26 under the influence of forces exerted by pulling the armature wire through slots 26 during the initial stage of winding the armature wire on core 14. According to this invention, flanges 30 and 31 preclude liners 34 from axially shifting sufficiently to permit objectionable contact between core 14 and the uninsulated armature wire being wound on core 14.

As shown in FIG. 2, flanges 30 and 31 extend radially outwardly from sleeve portion 29 and are respectively disposed axially at opposite ends of core 14. Core 14 is thus disposed and confined against axial movement between flanges 30 and 31.

Flange 30 is formed with a reduced diametered hub-like body portion 36 which terminates at its end axially remote from core 14 in an enlarged diametered lip portion 37. Portion 36 has a uniform outer diameter, and the outer circumference of portion 36 is cylindrical and smooth. Portion 36 axially extends from the inner flange end face 39 adjacent to core 14 to the step-like juncture with lip portion 37. Lip portion 37 extends from the juncture with portion 36 to the opposite flange end face indicated at 40. The outer diameter of lip portion 37 is uniform and greater than that of portion 36 for engaging liners 34 in a manner to be described in detail later on.

In molding flange 30, the flat adjacent end face of core 14 forms a part of the mold in such a manner that the flange end face 39 is thus flat and seats against the axially opposing armature core end face as shown. Lip portion 37, which is axially spaced from end face 39 and thus from the adjacent end face of core 14, cooperates with portion 36 to effectively define in cross section a step or land as indicated at 42 in FIG. 2.

In the embodiment shown in FIG. 2, the radial distance measured on armature core 14 from the aligned rotational axes of the core and shaft 10 to the bottom of each armature slot 26 is uniform and slightly less than the radius of lip portion 37, but greater than body portion 36. Thus, (and assuming there are an even number of equiangularly spaced apart slots 26 as shown), the diametrical between the bottoms of any pair of diametrically opposed slots 26 is slightly smaller than the outer diameter of lip portion 37, but greater than the outer diameter of body portion 36.

Flange 31 is the mirror image of flange 30. Accordingly, like reference numbers suffixed by the letter "a" have been applied to designate the corresponding portions and surfaces of flange 31.

Liners 34 extend at both ends axially beyond the oppositely directed end faces of core 14 by sufficient distances to overlie and seat on the outer peripheries of lip portions 37 and 37a. Thus with the relative diametrical or radial dimensions just described for lip portions 37 and 37a and the bottoms of slots 26, it will be appreciated that the outer ends of the bottom portions of liners 34 will snugly seat against the outer peripheries of lip portions 37 and 37a. As a result, lip portions 37 and 37a will frictionally engage the outer ends of the bottom portions of liners 34 with sufficient motion-resisting force as to axially retain liners 34 in place during the initial stage of winding the armature wire on core 14 and before sufficient armature wire has been wound to secure liners 34 against displacement in slots 26. The portions of liners 34 that are engaged by lip portions 37 and 37a are indicated at 44 in FIGS. 2 and 2A.

To provide a sufficient frictional grip for axially retaining liners 34 in place during the initial stage of winding, the diameter of lip portions 37 and 37a are sufficiently large to bend the engaged ends of liners 34 slightly radially outwardly. One example of satisfactory flange and armature core dimensions is as follows:

Outer diameters of flip portions 37 and 37a    0.702 in.

Diametrical distance between the bottoms of diametrically opposite armature core slots    0.693 in.

With the foregoing dimensions, it is clear that lip portions 37 and 37a extend radially beyond the bottoms of slots 26 by approximately 0.0095 inches. This radial distance is sufficient to enable lip portions 37 and 37a to securely, frictionally engage the bottom portions of the ends of liners 34. In the foregoing example, each of the axial distances between end faces 39 and 40 of flange 30 and between end faces 39a and 40a of flange 31 may be approximately 0.125 inches. Thus, the axial length of each liner 34 is such that each end protrudes axially beyond core 14 by approximately 0.125 inches.

Figure 6:
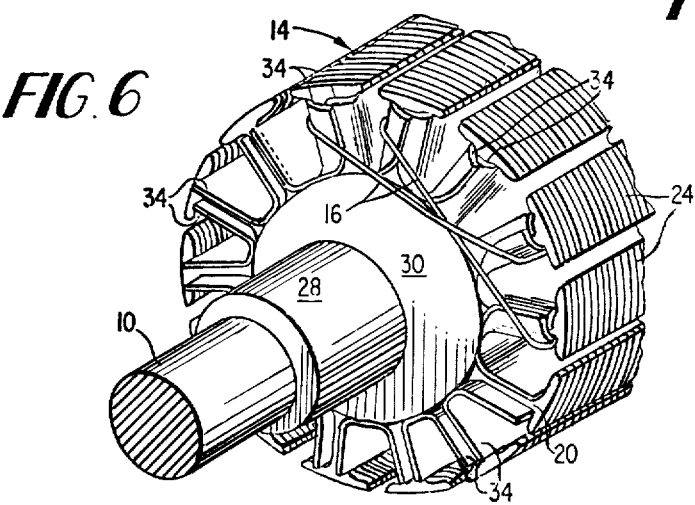
FIG. 6 is an enlarged fragmentary perspective view illustrating the armature construction of FIG. 2 and a partially wound armature winding.

Since liners 34 extend at both ends axially beyond core 14 by a small, but significant distance, slight axial slippage of liners 34 in slots 26 may be tolerated without exposing the armature core surfaces 20 to the armature wire that is wound on the core. However, in the preferred embodiment of this invention, the frictional engagement of liners 34 by lip portions 37 and 37a is significantly great to retain liners 34 in position where substantially equal axial lengths of the liners protrude beyond the armature core end faces. These axially protruding ends of liners 34 are folded or partially bent over the exposed end faces 20 of ribs 22 by wrapping the armature wire around the armature core ribs as shown in FIG. 6. In this manner a layer of electrical insulation is provided between the coils of winding 16 and the armature core ends, and winding 16 will be completely electrically insulated from core 14 by liners 34. When the initial turns of armature coil wire are wrapped around ribs 20, liners 34 will be secured against bodial movement relative to core 14 by the partially wound armature winding.

From the previously described construction of flanges 30 and 31 it will be appreciated that all of those portions of flanges 30 and 31 that have a diameter equal to or greater than the diametrical distance between bottoms of diametrically opposite armature core slots are axially spaced apart from the oppositely directed end faces of core 14. Those flange portions, namely portions 36 and 36a, that are immediately adjacent to the end faces of core 14 have diameters that are smaller than the diametrical distance between bottoms of diametrically opposite armature core slots. This construction effectively avoids the objectionable entry of insulating sleeve molding material into slots 26 during the molding of sleeve member 28 on shaft 10. In the previous dimensional example, the outer diameter of flange portions 36 and 36a may be approximately 0.612 inches. As a result, the outer peripheries of flange portions 36 and 36a will be spaced radially inwardly from the bottoms of slots 26 by approximately 0.035 inches to thereby avoid entry of the insulating sleeve molding material into slots 26.

In the foregoing embodiment, it is clear that liners 34 are axially retained in place during the initial stage of winding the armature coil wire on core 14 solely by frictional engagement and more particularly by frictional engagement only with lip portions 37 and 37a of flanges 30 and 31. In the embodiment shown in FIGS. 7 and 8, the armature construction is the same as that shown in FIG. 2 except that the relative liner retaining flange, armature core and insulating liner dimensions have been varied in such a manner that liners 34 are axially retained in place by axial abutment with axially opposed flange surfaces. Like reference numerals have been applied to designate like parts in the embodiment shown in FIGS. 7 and 8.

Referring to FIG. 7 the configuration of the liner retaining flanges in the same as that shown in FIG. 2. But the relative dimensions are such that liners 34 are confined axially between the annular, axially opposing surfaces of lip portions 37 and 37a instead of frictionally engaging the outer peripheries of the lip portions. As shown in FIG. 7, the bottom edges of the protruding ends of liners 34 axially butt against the axially opposing annular faces of lip portions 37 and 37a. In this manner liners 34 are axially retained in place during the initial stage of winding the armature coil wire on core 14. The construction of the armature assembly shown in FIGS. 7 and 8 is otherwise the same as that shown in FIG. 2.

Figure 8:
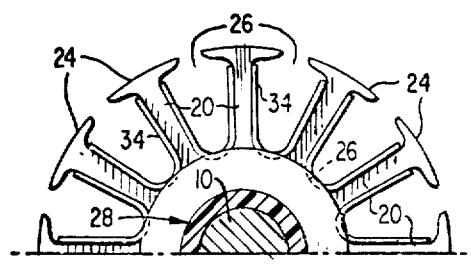
FIG. 8 is a section taken substantially along lines 8—8 of FIG. 7.

In the embodiment shown in FIGS. 7 and 8, it will be appreciated that the outer diameters of lip portions 37 and 37a are sufficiently greater than the diameterical distance between the bottoms of diametrically opposite armature core slots so as to provide the axially directed, opposing liner abutment surfaces. It also will be appreciated that in the embodiment of FIG. 7 the axial distance between the axially opposing faces of lip portions 37 and 37a is at least substantially equal to or slightly greater than the axial length of liners 34 in slots 26 to thereby enable liners 34 to be received axially between lips 37 and 37a.

As shown in FIG. 6, liners 34, extend sufficiently beyond core 14 so that the protruding portions of two liner side walls will overlap each other when they are folded over the end face of the core by wrapping the armature wire around ribs 20.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In an electric motor armature assembly having an armature core mounted on an armature shaft and having walls which define a plurality of conductor-receiving slots, an armature winding wound on said core and having at least one conductor extending through said slots, a plurality of insulating liners positioned one in each of said slots for electrically insulating said winding from the slot-defining walls of said core, said liners extending at both ends axially beyond said slots, and a molded one-piece member coaxially receiving said shaft and having a sleeve portion and a pair of retainer portions extending radially from said sleeve portion, said member being formed from electrical insulating material, said sleeve portion being disposed between said core and said shaft and electrically insulating said shaft from said core, said retainer being positioned and dimensioned to be engageable with said liners at least during the initial stage of winding said winding on said core for resisting axial dislodgement of said liners from said slots.

2. The electric motor armature assembly defined in claim 1 wherein the surfaces of said retainer portions which are engageable with said liners are circumferentially extending surfaces.

3. The electric motor armature assembly defined in claim 1 wherein the surfaces of said retainer portions which are engageable with said liners are axially opposed surfaces.

4. The electric motor armature assembly defined in claim 1 wherein said retainer portions are a pair of flanges respectively disposed axially adjacent to the oppositely directed axial end faces of said core.

5. The electric motor armature assembly defined in claim 4 wherein said flanges are formed with axially opposed surfaces and wherein said liners have portions disposed axially between said axially opposed surfaces.

6. The electric motor armature assembly defined in claim 1 wherein said core is disposed axially between said retainer portions, and wherein said retainer portions confine said core against axial displacement relative to said shaft.

7. The electric motor armature assembly defined in claim 1 wherein said retainer portions are a pair of flanges respectively disposed axially adjacent to the oppositely directed axial end faces of said core, said flanges having lips extending only slightly radially beyond the bottoms of said slots and positioned to be seatable against bottom surfaces of the liner ends which extend axially beyond said core.

8. The electric motor armature assembly defined in claim 1 wherein said lips are axially spaced from the adjacent faces of said core.

9. The electric motor armature assembly defined in claim 1 wherein said liners have end portions engaged by said winding and folded over the end faces of said core to provide a layer of electrical insulation between said winding and regions of said end faces.

10. The electric motor armature assembly defined in claim 9 wherein the folded liner end portions provide the sole layer of electrical insulation between said winding and said end faces.

11. The electric motor armature assembly defined in claim 9 wherein each of said liners is formed from a pliable electrical insulating material.

12. The electric motor armature assembly defined in claim 9 wherein said folded liner end portions are held in their folded condition only by engagement with said winding.

13. The electric motor armature assembly defined in claim 9 wherein the surfaces of said retainer portions which are engageable with said liners are spaced from the axially oppositely directed end faces from said core and from the folded liner end portions.

* * * * *

UNITED STATES PATENT OFFICE
CERTIFICATE OF CORRECTION

PATENT NO. : 3,917,967
DATED : November 4, 1975
INVENTOR(S) : Russell O. Robison and Malvin L. Fender It is certified that error appears in the above—identified patent and that said Letters Patent are hereby corrected as shown below:

Column 1, Line 29, delete "objectional" and insert --objectionable--.
Column 2, Line 55, delete "view" and insert --taken--.
Column 3, Line 6, delete "commutatot" and insert --commutator--.
Column 4, Line 55, following "diametrical" insert --distance--.
Column 7, Line 11, following "retainer" insert --portions--.

Signed and Sealed this

Thirteenth Day of July 1976

[SEAL]

Attest:

RUTH C. MASON
Attesting Officer

C. MARSHALL DANN
Commissioner of Patents and Trademarks